United States Patent [19]

Robert et al.

[11] Patent Number: 5,401,441
[45] Date of Patent: Mar. 28, 1995

[54] PREPARATION OF METAL OXIDE CONDUCTIVE POWDERS

[75] Inventors: Jean C. Robert, Chalon-sur-Saone; Jean I. Lemerle, Antony, both of France

[73] Assignee: Eastman Kodak Company, Rochester, N.Y.

[21] Appl. No.: 71,913

[22] Filed: Jun. 3, 1993

[51] Int. Cl.$^6$ ............................................. H01B 1/06
[52] U.S. Cl. ................................. 252/518; 423/617; 423/618
[58] Field of Search ................ 505/1, 737, 738, 734; 252/507, 508, 509, 500, 518; 501/12; 423/618, 592, 606, 608, 335, 636, 617, 622, 610, 625, 624

[56] References Cited

U.S. PATENT DOCUMENTS

| | | | |
|---|---|---|---|
| 4,431,764 | 2/1984 | Yoshizumi | 252/518 |
| 4,495,276 | 1/1985 | Takimoto et al. | 430/527 |
| 4,880,772 | 11/1989 | Pederson et al. | 505/1 |
| 4,923,682 | 5/1980 | Roberts et al. | 423/611 |
| 4,994,433 | 2/1991 | Chiang | 505/1 |
| 5,089,248 | 2/1992 | Akhtar | 423/604 |
| 5,196,388 | 3/1993 | Shyu | 501/134 |

FOREIGN PATENT DOCUMENTS

| | | |
|---|---|---|
| 61-205625 | 11/1986 | Japan . |
| 63-11519 | 1/1988 | Japan . |
| 63-020342 | 1/1988 | Japan . |
| 2-167821 | 6/1990 | Japan . |
| 2-196029 | 8/1990 | Japan . |

OTHER PUBLICATIONS

*Hackhs Chemical Dictionary*, Fourth Edition, McGraw Hill Book Company (1972) p. 676.

*Primary Examiner*—Mark L. Bell
*Assistant Examiner*—Paul Marcantoni
*Attorney, Agent, or Firm*—J. Jeffrey Hawley

[57] ABSTRACT

The invention relates to the preparation of conductive metal oxide powders.

The method according to the invention comprises the following stages: a) a colloidal aqueous solution of crystalline particles of at least one metal oxide or a composite oxide of several metals is formed, by hydrolysing a starting solution containing metal ions and an agent for complexing the metals, (b) heat treatment is carried out. Any residual salts and residual complexing agent are eliminated before or during the heat treatment (b).

Application to the manufacture of antistatic coatings.

10 Claims, No Drawings

PREPARATION OF METAL OXIDE CONDUCTIVE POWDERS

The present invention relates to the preparation of conductive powders in the form of metal oxide particles, and the transparent antistatic coatings formed from these powders.

To obtain fine antistatic transparent coatings on substrates such as glass or plastic materials, a conductive coating composition can be applied to these substrates, prepared by dispersing particles of a conductive substance in a binder in the presence of a solvent.

Conductive metal oxides make it possible to obtain antistatic coatings transparent to actinic radiation and insensitive to humidity. For example, substrating coatings of $SnO_2$ doped with antimony are used for photographic applications. For these applications, the conductive coatings, in addition to having low resistivity, must be transparent to actinic radiation and have, in respect of this radiation, a dispersive power which is as low as possible.

In order to reduce to a minimum the variability in the electrical and optical properties, it would be desirable for the size of the particles to be small, for the size distribution of the particles to be as narrow as possible and for the particles to have uniform shape and degree of crystallinity. Moreover, these particles should be able to be dispersed in the normal binders, be chemically and thermally stable and not react to light.

Many techniques for preparing conductive particles enable transparent films to be formed.

U.S. Pat. No. 4,495,276 describes in its examples a synthesis of tin oxide particles doped with antimony in which tin and antimony chlorides are dissolved in an alcohol solution. Hydrolysis is then carried out with soda to a pH of 3. A coprecipitate of fine particles of antimony tin oxide is obtained. After separation by centrifuging and washing, in order to prevent these fine particles conglomerating, they are mixed with barium sulphate and then spray dried in a furnace at 600° to 900° C. A powder with a mean size of $<0.5$ μm is obtained comprising tin oxide and barium sulphate. The bulk resistance of the powders is 8-25 $\Omega$.cm. Films containing these particles in a proportion of 2 g/m² have surface resistivities of $10^6$ to $10^9$ $\Omega/\square$, have a light scattering efficiency which varies between 50 and 15% and which drops to 9% in the presence of a gelatin overcoat.

One of the problems associated with this type of preparation is that it is difficult to control the size, shape and size distribution of the particles obtained by this method. Thus, because of the variability of these parameters, the optical transmission remains low, except when an overcoat is put on the antistatic coating, a preferred embodiment of this reference. In addition, it is necessary to limit the sintering and aggregation of the particles which occurs during the heat treatment of the raw powder. This is why the process of spray drying is associated with this method of preparation so as to allow a better control of the grain size distribution.

It is also possible to prepare a solid crystalline solution of tin oxide containing antimony as in U.S. Pat. No. 4,775,412, in which ammonium or alkali metal bicarbonate is introduced into an aqueous acid solution in which a tin compound and an antimony compound are dissolved in an Sb/Sn molar ratio of 0.005 to 0.3 so as to form a gel. The impurities are then eliminated from the gel and then ammonium hydroxide solution is added to form a paste. This paste is heated under pressure, for example for 6 hours at 200° in an autoclave. Crystalline particles of tin oxide containing antimony are obtained.

U.S. Pat. No. 4,937,148 also proposes a method enabling fine conductive particles having a narrow particle distribution to be prepared, for forming transparent conductive coatings of indium tin oxide (ITO). According to this method, an aqueous solution of an indium and tin compound is progressively hydrolysed, controlling the pH between 8 and 12, so as to form a colloidal solution of oxide or hydrated oxide particles. If the pH of the reaction is less than 8, the particle size distribution is very wide, and the more the pH decreases, the more the metal oxides and hydroxides precipitate instead of remaining in colloidal solution. After this stage, the by-products are eliminated by rinsing, and the colloidal particles are dried and calcined for example at 350° C. for 3 hours and then at 650° for 2 hours.

The Japanese patent application JPA 58036925 describes a preparation making it possible to prevent the conglomeration of the particles, which consists of carrying out, in an acid medium, the hydrolysis of an aqueous solution of salts of tin and another substance chosen from amongst Sb, In, Ga and Bi. An organic solvent is then added to prevent the aggregation of the microparticles formed and then the latter are isolated by distillation. Then heat treatment is carried out at between 300° C. and 1200° C. In the same patent application, the hydrolysis can also be carried out in an alkaline medium. This application does not contain any information about the effect of the heat treatment on the particles with regard to sintering, nor any results relating to optical transmission or conductivity.

The Japanese patent application JPA 61122123 describes the hydrolysis of an antimony and tin chloride solution dissolved in a carboxylic acid such as formic acid or acetic acid. The hydrolysis takes place in an acid medium. After heat treatment for 2 hours at 500° C., particles are obtained with a bulk resistivity of 0.8-1 $\Omega$.cm. These particles improve the conductivity of silicone-coated plastics or rubbers without impairing their transparency.

U.S. Pat. No. 4,880,772 describes the preparation of thin films by applying a precursor solution in film form and then subjecting the film so obtained to pyrolysis. This method consists of forming a gel obtained from a solution of salts of Zr, Y, La and Sr in an amino acid so as to prevent precipitation of the constituents. The complexing and glass-forming properties of the amino acid are used to form a viscous precursor solution. The pyrolysis is complete at 700° C. In this way superconductive films are obtained.

It can be seen that one of the major problems in the obtaining of conductive metal oxide powders is to find a compromise between the need to obtain particles of small size having a narrow particle size distribution, and the need for a high-temperature heat treatment, a treatment which makes it possible to obtain crystalline oxide particles having high conductivity and low sensitivity to humidity but which has the result of producing sintering, that is to say the conglomeration of the particles and their poor light transparency.

Thus one of the objects of the present invention is a method of preparing fine metal oxide particles having high conductivity, for example conductive powders of oxides of Sn, Ti, Al, Zr, In, Si, Sb, Bi, Mo, W, Zn, V and Ga, such as mixed particles of antimony tin oxide or mixed particles of indium tin oxide.

The method according to the invention for obtaining fine conductive metal oxide powders comprises the following stages:

(a) a colloidal aqueous solution of crystalline particles is formed from at least one metal oxide or a composite oxide of several metals, by hydrolysing a starting solution containing metal ions;

(b) heat treatment is carried out.

The method is characterised in that:

1) the starting solution, in addition to the metal ions, comprises a complexing agent for the metals which it contains;

2) the residual salts and the residual complexing agent are eliminated before or during the heat treatment (b).

According to the present invention, conductive particles of metal oxides are prepared by carrying out a controlled hydrolysis of a solution containing one or more metal ions in the presence of a complexing agent for these ions, at a pH enabling a colloidal solution of fine crystalline particles of metal oxide(s) having a narrow grain size distribution to be obtained.

Heat treatment is then carried out at a temperature enabling the crystallisation to be improved whilst preventing sintering. The elimination of any residual salts in general takes place before the heat treatment, for example by washing/centrifugation or by dialysis, but can also take place during the heat treatment. Preferably, the elimination of any residual complexing agent also takes place during the heat treatment.

The advantage of this invention lies especially in that it is possible to obtain conductive particles at a lower temperature than in the prior art and also in that particles of a mean size between 2 and 20 nm and powders having a resistivity of less than and $10^9$ Ω.cm are obtained. In prefered embodiments, powders of a mean size comprised between 10 and 20 nm and having a resistivity equal to or less than 100 Ω.cm are obtained.

Another object of the invention is to obtain transparent antistatic films containing these particles having a surface resistance of between $10^6$ and $10^{11}$, preferably between $10^7$ and $10^9$ Ω/□, a total transmittance equal to or less than 95%, and a direct transmittance/total transmittance ratio of more than 90% between 380 and 800 nm.

The metal ions contained in the starting solution are chosen from amongst $Zn^{2+}$, $Ti^{4+}$, $Al^{3+}$, $Sn^{4+}$, $Sn^{2+}$, $In^{3+}$, $Bi^{3+}$, $Si^{4+}$, $Sb^{3+}$, $Sb^{5+}$, $Mo^{6+}$, $W^{6+}$, $Zr^{4+}$, $V^{5+}$ and $Ga^{2+}$. The metal salts supplying these ions in the starting solution must be hydrolysable at the pH at which the formation of the colloidal solution takes place. For example, a soluble tin salt hydrolysable at an acid pH is used to obtain particles of tin oxide $SnO_2$.

If it is desired to obtain a composite metal oxide, for example a metal oxide doped with another metal, a small quantity of this other metal is introduced in the form of a soluble salt in the starting solution, or else it is possible to dope the metal oxide obtained by impregnation with aqueous solutions containing this other metal, before the heat treatment. Thus, Sn particles doped with $Sb^{5+}$, $Sb^{3+}$ with improved conductivity can be obtained or in the same manner mixed particles of indium tin oxide (ITO).

The antimony tin oxide powders typically comprise antimony and tin in an Sn/Sb weight ratio of between 0.1 and 20%.

The indium tin oxide powders typically comprise indium and tin in an Sn/In weight ratio of between 0.1 and 20%.

The metal compounds which can be used in the starting solution are compounds which are soluble in water and hydrolysable. For example sodium or potassium stannates, tin chloride, indium chloride, indium nitrate, indium sulphate, potassium antimonate, antimony trichloride, can be used.

The concentration of the hydrolysable compound containing the metal in the starting solution depends on the hydrolysable compound, but it is generally between 0.05 and 1.5M/1.

The starting solution comprises in addition a complexing agent for the metal ion or ions in solution. These complexing agents have an essential role in the present invention, since they enable the hydrolysis reaction to be controlled.

As complexing agents any compound can be used which is capable of complexing the metal ions before the amorphous hydroxide precipitates and which is capable of forming a stable complex which may then be dissociated, for example by modifying the pH. During the hydrolysis reaction, by varying the pH, a solution will be obtained containing microcrystalline metal oxide particles whilst preventing the formation of amorphous metal hydroxides.

Organic multifunctional compounds such as hydroxacid, amino-acids, mercapto-acids, dithiols, polyols or polyacides are preferred complexing agents. For example, as acid alcohol, tartaric acid, glycolic acid, citric acid or malic acid can be used; as aminoacids, glycine and aniline can be used; as mercaptoacids thioglycolic acid and thiomalic acid can be used.

In the case of solutions containing salts of tin and/or antimony, preferably tartaric acid can be used as a complexing agent.

It is in fact known that tin can form complexes with tartaric acid in a neutral or slightly acid medium (J Maziéres, M Béaoui, J Lemerle, J Lebebvre, Rev. Chem. Miner (1987) 24, 641). Any modification, even moderate, of the pH of the acid solution containing this complex causes the dissociation of this complex and then the growth of the colloidal tin oxide particles.

It is also known that tin can form complexes with tartaric acid in a basic medium (J Maziéres, M Béaoui, J Lemerle, J Lebebvre, *Bull Soc Chim Fr* 1991, 127.1-4). Decreasing the pH of the basic solution containing this complex causes the dissociation of this complex and then the growth of the colloidal tin oxide particles.

Tartaric acid can also be used as a complexing agent in solutions containing indium and tin.

The concentration of the complexing agent in the starting solution depends on the metal ion to be complexed and the pH of the starting solution. For example, if tin chloride $SnCl_4, 5H_2O$ is used as the tin-containing compound, 0.5–1.2 moles of complexing agent will be used per mole of tin. A stable solution will then be obtained which will not hydrolyse at this pH. A slight excess of complexing agent may be desirable since, if the complexing agent is eliminated by heating at the time of heat treatment, this allows aeration which prevents sintering.

Hydrolysis is carried out by slowly introducing an acid or base into the starting solution. The choice of an acid or base depends on the pH of the starting solution and the pH at which the formation of the colloidal solution containing metal oxides and/or hydroxides is obtained.

Preferably, hydrolysis is carried out in strongly acidic medium, the particles obtained in this case having lower resistivities.

For example, if in the starting compound containing tin chloride ($SnCl_4, 5H_2O$) and tartaric acid as complexing agent in a tartaric acid/Sn molar ratio between 0.5 and 1.2, the pH of the solution is of the order of 3. By introducing an acid, for example HCl, until a pH of between 1 and 2 is obtained, or else a base, for example soda, until a pH of between 5 and 7 is obtained, hydrolysis will take place progressively with the formation of a colloidal solution.

In the case of a starting solution containing indium chloride $InCl_3$ and tin chloride $SnCl_4, 5H_2O$, in the presence of tartaric acid as complexing agent in a tartaric acid/In molar ratio of between 0.5 and 1.2, the pH of the starting solution is of the order of 1. Hydrolysis is carried out by slowly introducing a base into the acid starting solution, for example $NH_4OH$, until a pH of between 2 and 4 is obtained.

Preferably hydrolysis is carried out at a temperature of 20° to 60° C.

Electron diffraction measurements showed that the colloidal solution contained crystalline particles of metal oxide, hydrated to a greater or lesser extent. This is particularly advantageous when it is desired to obtain conductive particles, since it is well known that conductivity increases with the crystalline nature.

Once the colloidal solution has been obtained, it can be purified by eliminating certain residual ions, for example chloride ions, by dialysis. However, this is not necessary in every case and simple washing/centrifugation cycles suffice in general.

The precipitate from the colloidal solution is then recovered in a conventional manner, for example by filtering. It is then dried in an oven, for example at 100° C., for one night in order to eliminate the water.

Heat treatment is then carried out at a temperature which must be sufficient to eliminate any residual complexing agent, if it has not already been eliminated before the heat treatment. The advantage of the present invention is that relatively low heat treatment temperatures can be used, for example of the order of 500° C., preferably between 250° and 400° C., which reduces the phenomenon of sintering. The conductivity of the powder obtained after the treatment is the same as if much higher temperatures had been used, for example conventionally of the order of 700°–900° C., as in the methods of the prior art. This seems to be due to the fact that the oxide before treatment is already crystalline.

The particles obtained by the process of the invention, even if conglomerated, are not sintered and can easily be dispersed again without its being necessary to subject them to prolonged pulverising before dispersing them in a binder, as in the prior art. The size of the particles is measured by transmission electron microscopy or by quasi-elastic light scattering.

The resistivity of the powders is measured by producing a pellet by means of a press (5 tonnes pressure), placing this pellet between two electrodes and measuring the resistance at a pressure of 0.5 tonnes.

To test the metal oxide powders according to the invention, a certain quantity is taken from them which is dispersed in a water-soluble binder. The aqueous dispersion is applied with a scraper blade to a polymer base.

The resistance of the coatings obtained from these powders is measured by means of a discharge kinetics method. A measuring test piece is cut from the coating and one of its ends is electrically charged by induction. The time taken for the charges to migrate to the other end of the test piece is then measured, and this can then be related to the conductivity of the film. The measurements are made at a relative humidity of 50%.

Transmittance of the layers is measured with a spectrophotometer between 380 and 800 nm. Total transmittance is obtained with an integrating sphere.

The following examples illustrate the invention.

EXAMPLE 1

7.56 g (0.03 moles) of potassium antimonate $KSb(OH)_6$ is dissolved in 400 ml of water at 60° C. After cooling, 120 g (0.8 moles) of tartaric acid is introduced. After a transparent solution is obtained, 280.5 g (0.8 moles) of tin chloride ($SnCl_4, 5H_2O$) is introduced and a colourless solution is recovered. The chloride ions are eliminated by dialysis and HCl 1N is added slowly by means of a dropping funnel until a pH of 1 is obtained. After 24 hours at a pH of 1, a colloidal precipitate is seen to appear, which thickens as time goes by. A white solution is recovered and dried at 70° C. Heat treatment is carried out at 300° C. under a flow of oxygen to eliminate the organic compounds. An $SnO_2$ powder containing antimony is recovered. The resistivity of the powder is less than 5 $\Omega.cm$.

EXAMPLE 2

Following the procedure in the previous example, tin is introduced in the form of potassium stannate (59.8 g of $K_2SnO_3, 3H_2O$) (0.2 moles) and 15 g (0.1 moles) of tartaric acid. A transparent solution is obtained in a few days. The potassium ions are eliminated by means of an ion exchange resin (Dowex ® 50×2, 200). The chloride ions are eliminated by dialysis and HCl 1N is slowly added by means of a dropping funnel so as to obtain a pH of 1.1. After 24 hours at a pH of 1.1, a colloidal precipitate is seen to appear which thickens over a period of hours. A white solution is recovered and dried at 70° C. Heat treatment is carried out at 400° C. The resistivity of the powder is 10 $\Omega.cm$.

EXAMPLE 3

0.2 moles of $SnCl_4, 5H_2O$ is dissolved in an aqueous solution with 0.2M of tartaric acid. Under strong agitation 0.02 moles of solid $SbCl_3$ is added, and then even agitation is maintained. The pH of the solution is adjusted to 1.2 by adding 0.75 moles of soda. A precipitate forms slowly whilst the solution turns yellow.

The precipitate is recovered either by centrifugation, washing with distilled water, then recentrifugation and drying with air, or filtration over fritted material, washing with distilled water, rinsing with alcohol and drying.

The precipitate is heat treated for 2 hours at a temperature equal to 300° C. The resistivity of the powder is 20 $\Omega.cm$.

EXAMPLE 4

1.5 g of oxide powder is dispersed in 10 g of water with 3 g of gelatin in a proportion of 10% in water using a ball mill. After 35 h of milling, water is added to dilute the dispersion (2.3 g dispersion +1.5 g of water), which is then left for 15 minutes in an ultrasonic bath. The dispersion is applied in a coating using a scraper device with a 0.2 mm blade, and after drying an overcoat is applied containing 10% of gelatin using a 0.5 mm blade.

The results of these coatings containing the oxides of Examples 1 and 2 are given in Table 1, where Tt is the total transmission, Td the direct transmission measured at 380 nm and 800 nm, respectively, and R is the resistivity.

TABLE 1

| Oxide example | $T_t$ (800 nm) | $T_d/T_t$ % (800 nm) | $T_t$ (380 nm) | $T_d/T_t$ % (380 nm) | R (G/□) |
|---|---|---|---|---|---|
| 1 | 99 | 97 | 95 | 95 | 0,2 |
| 2 | 99 | 99 | 96 | 92 | 0,1 |

EXAMPLE 5 (Comparative)

Following the procedure of example 3, the pH of the solution is adjusted to 5 by adding 1 mole of soda.

The powder thus obtained is heated to 300° or 800° C. The resistivities of the Sb-doped $SnO_2$ powder are 18,000 and 18 Ω.cm respectively.

EXAMPLES 6 TO 8

Following the procedure of Example 3, citric acid, glycolic acid and malic acid are used instead of tartaric acid, in the same amount (0.2 mole). After heat treatment at 300° C., the resistivities of Sb-doped $SnO_2$ powders are 25, 35 and 105 Ω.cm, respectively.

EXAMPLE 9

Following the procedure of Example 3, 0.12 mole of thiomalic acid are used instead of tartaric acid. The pH is adjusted to 0.6. Heat treatment is carried out at 300° C. over a period of 2 hours. The resistivity of the Sb-doped $SnO_2$ powder is 80 Ω.cm.

EXAMPLE 10

90 g (0.53 mole) of glycine are dissolved in 200 ml of water, then 140.24 g (0.18 mole) of $SnCl_4$, $5H_2O$ and 3,28 g (0.006 mole) of $SbCl_3$ are added. After dissolution, a clear orange solution is obtained. After dialysis, a yellow gel is recovered, which is dryed and heat treated at 400° and 500° C. The resistivities of the Sb-doped $SnO_2$ powders are 30 and 5 Ω.cm, respectively.

EXAMPLE 11

In a 250 cc round-bottomed flask, 7.5 g of tartaric acid is mixed in 50 ml of water under agitation until a clear solution is obtained. Then 11 g of $InCl_3$ in powder form is introduced and agitation is carried out until a clear solution is obtained, and then 1.3 g of $SnCl_4$, $5H_2O$, previously milled, until complete dissolving takes place.

When the mixture is homogeneous, it is heated over an oil bath at 50° C. for 2 hours. It is left to cool and then 20 cc of commercial $NH_4OH$ is added slowly by means of a dropping funnel. The reaction is highly exothermic and, after 2 hours, at a pH of 4, a colloidal precipitate is seen to appear, which thickens as time goes by. The mean size of the particles is comprised between 10 and 20 nm. This precipitate is recovered, washed with water and centrifuged at 2500 rpm for 30 min. The washing and centrifugation is repeated 4 times. The precipitate is recovered and is dried in an oven for an entire night at 100° C.

It is ground in a mortar and then heat treatment is carried out for 3 hours at 350° C. under oxygen. The resistivity of the black powder obtained is less than 5 Ω.cm.

EXAMPLE 12 (COMPARATIVE)

5.67 g of $KSb(OH)_6$ (0.02 moles) is dissolved in 300 ml of deionised water at 60° C. When totally dissolved, 210.3 g of $SnCl_4,5H_2O$ (0.6 moles) is added. The solution is agitated for 2 hours at 50° C. The residual salts are then eliminated by dialysis. The product obtained is dried and then heat treatments are carried out at 300° C., 400° C. and 500° C. under oxygen. The resistivities obtained are respectively 120,000, 420 and 5 Ω.cm.

It can be seen that in the absence of a complexing agent it is necessary to treat the powder at a higher temperature in order to obtain low resistivities.

We claim:

1. A method for obtaining conductive metal oxide powders comprising tin oxide or mixed tin and antimony oxide or mixed tin and indium oxide, comprising the following steps: (a) obtaining a colloidal aqueous solution of crystalline particles formed by hydrolysing at a pH lower than 5 a starting solution containing aqueous soluble metal salts of one or more metal ions chosen amongst $Sn^{4+}$ or $Sn^{2+}$ and optionally, $In^{3+}$, $Sb^{3+}$ or $Sb^{5+}$ ions and a complexing agent for such metals ions;

(b) converting the crystalline particles formed under (a) into metal oxide by heat treatment at a temperature from 250° to 400° C.

2. A method according to claim 1, wherein the complexing agent is a hydroxyacid, an amino alcohol, a mercapto-acid, a dithiol, a polyol or a polyacid.

3. A method according to claim 2, wherein the complexing agent is a hydroxyacid chosen from amongst tartaric acid, glycolic acid, citric acid or malic acid.

4. A method according to claim 2, wherein the complexing agent is an amino acid chosen from amongst glycine or alanine.

5. A method according to claim 2, wherein the complexing agent is a mercapto-acid chosen from amongst thioglycolic acid or thiomalic acid.

6. A method according to claim 1, wherein the starting solution contains $Sn^{4+}$ and $Sb^{3+}$ or $Sb^{5+}$ ions, the complexing agent is tartaric acid, the tartaric acid/Sn molar ratio is between 0.5 and 1.2 and the pH of the hydrolysis is between 1 and 2.

7. A method according to claim 1, wherein the starting solution contains $Sn^{4+}$ and $In^{3+}$ ions, the complexing agent is tartaric acid, the tartaric acid/In molar ratio is between 0.5 and 1.2 and the pH of the hydrolysis is between 2 and 4.

8. A method according to claim 1 for obtaining $SnO_2$ conductive particles wherein the metal ions contained in the starting solution are $Sn^{4+}$.

9. A method according to claim 1 for obtaining Sb-doped $SnO_2$ conductive particles wherein the metal ions contained in the starting solutions are $Sn^{4+}$ and $Sb^{5+}$.

10. A method according to claim 1 for obtaining In-doped $SnO_2$ conductive particles wherein the metal ions contained in the starting solution are $Sn^{4+}$ and $In^{3+}$.

* * * * *